United States Patent [19]

Ando

[11] Patent Number: 4,774,611
[45] Date of Patent: Sep. 27, 1988

[54] ROTARY TO LINEAR CONVERTER FOR USE IN A MAGNETIC DISK DRIVE OR THE LIKE

[75] Inventor: Yasuhiko Ando, Tachikawa, Japan
[73] Assignee: Teac Corporation, Tokyo, Japan
[21] Appl. No.: 35,377
[22] Filed: Apr. 6, 1987
[30] Foreign Application Priority Data

Apr. 7, 1986 [JP] Japan .............................. 61-51868[U]

[51] Int. Cl.$^4$ .......................... G11B 5/56; G11B 21/02
[52] U.S. Cl. ....................................... 360/106; 74/89.2
[58] Field of Search ...................... 360/106, 109, 105; 74/89.2

[56] References Cited

U.S. PATENT DOCUMENTS 3,881,189 4/1975 Mayeda .............................. 360/106
4,161,004 7/1979 Dalziel .................................. 360/106

FOREIGN PATENT DOCUMENTS 59-227071(A) 12/1984 Japan .................................. 360/106

Primary Examiner—John H. Wolff
Attorney, Agent, or Firm—Woodcock Washburn Kurtz Mackiewicz & Norris

[57] ABSTRACT

A rotary to linear converter is disclosed as adapted for use as a transducer positioning mechanism in a magnetic disk drive wherein a transducer is transported across a series of concentric data storage tracks on a disklike record medium for accessing the individual tracks. A band of flexible, nonstretchable material such as stainless steel is looped about a pulley on a bidirectional drive motor shaft, with the opposite end portions of the band extending tangentially away from the pulley. The opposite ends of the band are anchored to a carriage, carrying the transducer, at points spaced from each other in the direction in which the carriage is to be moved reciprocably upon bidirectional rotation of the drive motor. While one end of the band may be coupled directly to the carriage, the other end is coupled thereto via a generally U-shaped spring member which is biased for imparting tension to the band at the time of assemblage. The band is medially secured to the pulley as by a threaded fastener element extending through a clearance hole in the band.

8 Claims, 4 Drawing Sheets

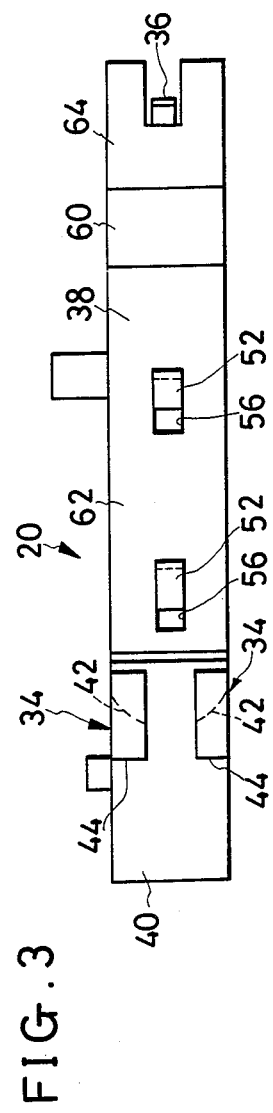
FIG.3
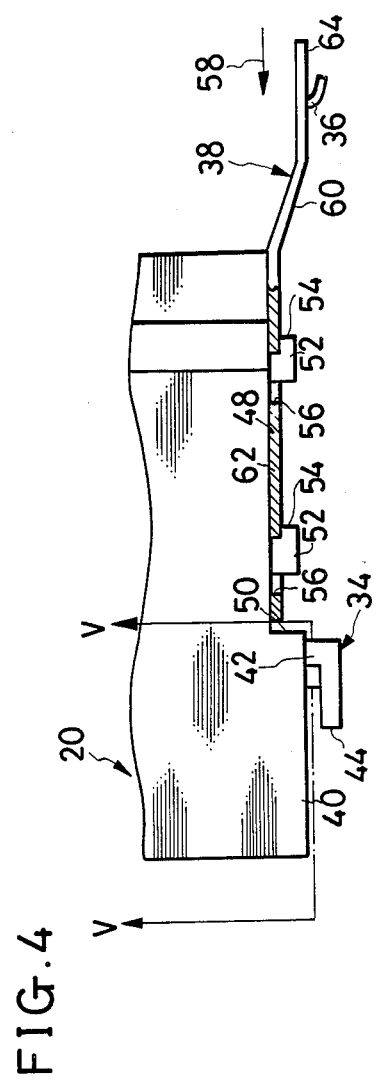
FIG.4
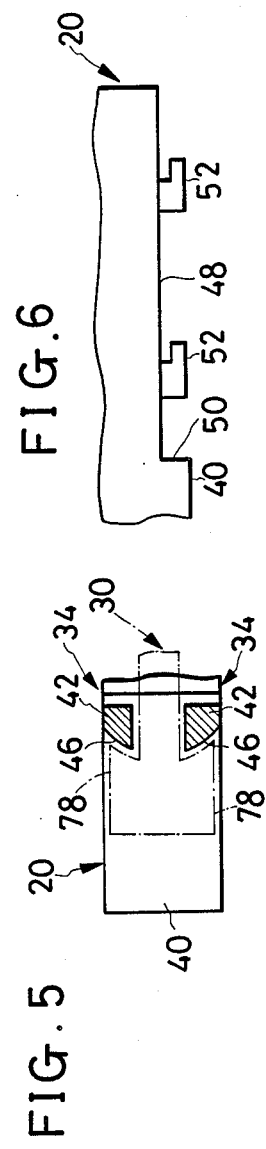
FIG.6
FIG.5

ROTARY TO LINEAR CONVERTER FOR USE IN A MAGNETIC DISK DRIVE OR THE LIKE

BACKGROUND OF THE INVENTION

My invention relates to a motion translating mechanism for the convertion of bidirectional rotary motion into rectilinear reciprocation, and more specifically to such a mechanism of the type having a band of flexible, nonstretchable material looped about a pulley on a drive shaft, with the opposite end portions of the band extending substantially tangentially away from the pulley and attached to a member to be reciprocated rectilinearly. The motion translating mechanism of my invention lends itself to use as a transducer positioning mechanism in apparatus having a transducer for data transfer with a disklike record medium.

In data transfer apparatus employing magnetic disks, for example, a positioning mechanism is employed for incrementally transporting the transducer or magnetic read/write head radially of the disk in order to access each of a series of concentric storage tracks on the disk surface. The concept of using a band of stainless steel or like material for the transducer positioning mechanism is per se not new but is taught for example, by U.S. Pat. Nos. 3,881,189 to Mayeda and 4,161,004 to Dalziel. In such known positioning mechanisms the steel band is wound a single turn about a pulley on the armature shaft of an electric, bidirectional drive motor, with the opposite end portions of the band extending in opposite directions tangentially away from the pulley. The ends of the band are attached to spaced-apart positions on the carriage which carries the transducer and which is guided for linear travel in a radial direction of the magnetic disk. Such motion translating mechanisms have found a widespread acceptance in disk drives by virtue of the accuracy of positioning and the simplicity and inexpensive of construction with a minimum of moving parts.

As heretofore constructed, however, the positioning mechanisms employing the steel band have had one shortcoming in connection with means for imparting tension to the band, the band tension being essential for the accurate positioning of the transducer by the mechanism. The Dalziel patent suggests an example of such band-tensioning means, comprising a helical tension spring coupled to one of the two pivot arms to which are fastened the opposite ends of the flexible band. I object to this and other known band-tensioning means as they are not so simple in construction as can be desired.

SUMMARY OF THE INVENTION

I have hereby invented how to effectively and inexpensively impart tension to the flexible, nonstretchable band in the motion translating mechanism of the type defined.

Broadly, my invention may be summarized as a rotary to linear converter comprising a rotary, bidirectional drive motor having a drive shaft, a pulley mounted to the drive shaft for joint rotation therewith and guide means defining a path generally tangent to the pulley on the drive shaft. A movable member is mounted to the guide means for reciprocating movement along the path and first and second pivotal engagement means are located on a movable member arranged in positions spaced apart from each other in the longitudinal direction of the path. A band of flexible, non-stretchable material having first and second ends is looped about the pulley with opposite end portions of the band extending away from the pulley in opposite directions along the path. The first end of the band is engaged with the first pivotal engagement means on the movable member so as to permit pivotal motion of a first end portion associated with the first end of the band in its own plane. A clearance hole is located on the band intermediate the first and second ends thereof. A tension spring affixed to the second end of the band imparting tension thereto engages the second pivotal engagement means on the movable member so as to permit pivotal motion of a second end portion of the band in its own plane. A headed fastener element is inserted in and through the clearance hole in the band for fastening the same to the pulley such that the band with the tension spring attached thereto automatically aligns itself in the longitudinal direction of the path when, with the fastener element not fully tightened, the first end of the band and the tension spring are pivotally engaged with the first and second pivotal engagement means.

The above and other features and advantages of my invention and the manner of realizing them will become more apparent, and the invention itself will best be understood, from a study of the following description and appended claims, with reference had to the attached drawings showing the preferred embodiment of the invention.

SUMMARY OF THE INVENTION

FIG. 3 is a side elevation of the transducer carriage forming a part of the positioning mechanism, the carriage being shown with a band-mounting strip attached thereto;

FIG. 4 is a top plan, partly broken away for illustrative convenience of the transducer carriage and band-mounting strip of FIG. 3;

FIG. 5 is a fragmentary section through the transducer carriage, taken along the line V—V in FIG. 4 and showing in particular hook means on the carriage for engagement with the flexible band of the positioning mechanism;

FIG. 6 is a fragmentary plan of the transducer carriage, showing in particular hook means on the carriage for engagement with the band-mounting strip;

DESCRIPTION OF THE PREFERRED EMBODIMENT

I will now describe in detail the rotary to linear converter of my invention as specifically adapted for use in a magnetic disk drive, in which the converter is used as a transducer positioning mechanism, translating the bidirectional, incremental rotation of an electric stepping motor into the linear, stepwise, back and forth travel of a magnetic transducer in a radial direction of a flexible magnetic disk. The transducer positioning mechanism embodying my invention is generally designated 10 in FIG. 1 and is therein shown together with a flexible magnetic disk 12. This magnetic disk is mounted on a turntable 14 driven directly by an electric disk drive motor 16.

Figure 1:
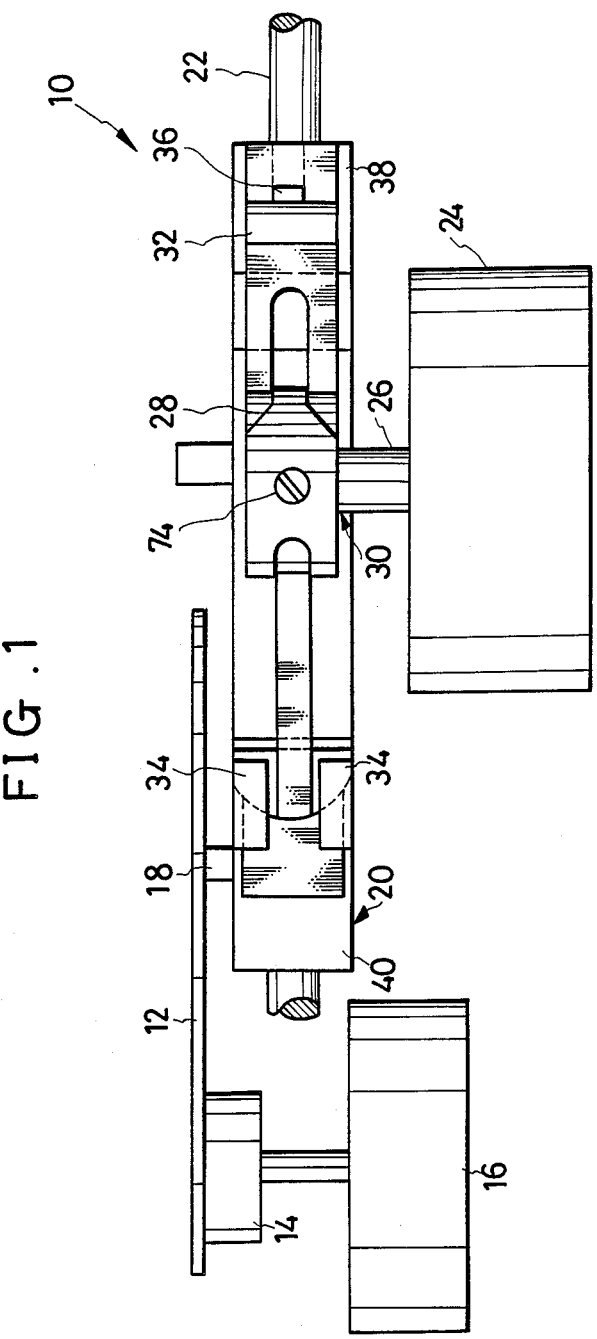
FIG. 1 is an elevation of the motion translating mechanism of my invention as adapted for use as a transducer positioning mechanism in a magnetic disk drive, the positioning mechanism being shown together with a magnetic disk and a drive motor therefor.
Figure 2:
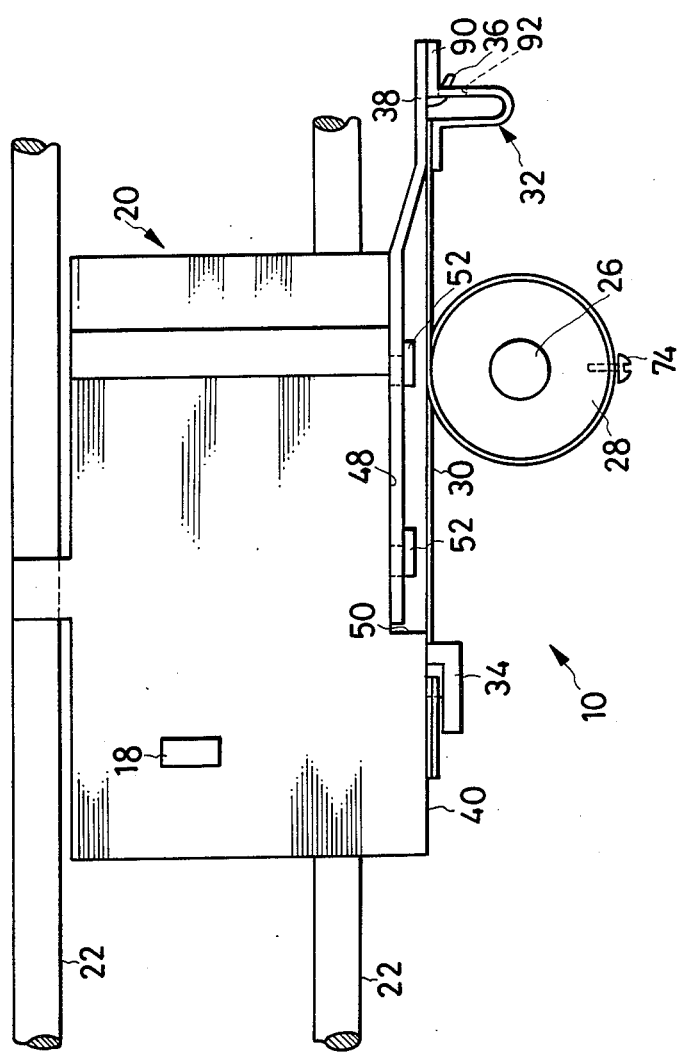
FIG. 2 is a top plan of the positioning mechanism of FIG. 1.

As shown in both FIGS. 1 and 2, a transducer 18 such as a magnetic read/write head is conveniently mounted on a carriage 20 forming a part of the positioning mechanism 10. The carriage 20 is slidably mounted on a pair of guide rods 22 extending radially of the magnetic disk 12. Therefore, as the carriage 20 travels along the guide rods 22, so does the transducer 18 radially of the magnetic disk 12 for accessing the individual data storage tracks, not shown, on the disk surface. The transducer positioning mechanism 10 functions to realize such travel of the transducer 18.

With reference directed also to FIGS. 1 and 2 the transducer positioning mechanism 10 may be outlined as comprising, in addition to the carriage 20, an electric, bidirectional rotary drive motor 24 of the known stepping type having a drive shaft 26 extending therefrom in a direction perpendicular to the plane of the magnetic disk 12, a pulley 28 rigidly mounted on the drive shaft 26 for joint rotation therewith, and a band 30 of flexible, nonstretchable material such as stainless steel looped about the pulley 28 and having its opposite ends coupled to the carriage 20. While one end, shown directed to the left in FIGS. 1 and 2, of the flexible band 30 is coupled directly to the carriage 20, the other end of the band is connected thereto via a generally U-shaped spring member 32 constituting a feature of my invention.

It will be observed from FIG. 2 that the opposite end portions of the band 30 extend away from the pulley 28 approximately in its tangential direction and parallel to the guide rods 22. The left hand end of the band 30 is engaged with a pair of first hooks 34 formed directly on the carriage 20, whereas the spring member 32 on the right hand end of the band is engaged with a second hook 36 formed on a rigid metal-made mounting strip 38 substantially immovably mounted to the carriage 20. The pair of first hooks 34 and the second hook 36 are spaced from each other in a direction parallel to the guide rods 22.

I have illustrated in FIGS. 3 and 4 the arrangement of the hooks 34 and 36 on the side surface 40, directed toward the pulley 28 on the drive shaft 26, of the carriage 20. Of a rigid plastic material, the carriage 20 is molded integral with the pair of first hooks 34 which project from its side surface 40 and which are spaced from each other in a direction parallel to the axis of the drive shaft 26 and of the pulley 28 therein. Each of the pair of first hooks 34 comprises a neck 42 having a cross sectional shape best depicted in FIG. 5, and an overhang or head 44, FIGS. 3 and 4, protruding therefrom in a direction away from the pulley 28. The necks 42 have convex surfaces 46, FIG. 5, directed away from the pulley 28 for sliding engagement with the left hand end of the band 30 in a manner to be detailed subsequently.

For attaching the rigid mounting strip 38, complete with the second hook 36, to the carriage 20, the side surface 40 of this carriage has a recessed portion 48, FIGS. 2, 4 and 6, with a step 50 created between this recessed portion and the remaining part of the carriage side surface 40 on which is formed the first pair of hooks 34 for engagement with the band 30. The recessed portion 48 of the carriage side surface 40 has formed thereon a pair of hooks 52, which are spaced from each other along the guide rods 22, for engagement with the mounting strip 38. The hooks 52 have overhangs 54, FIG. 4, protruding therefrom in a direction away from the step 50.

Figures 7, 8, 9, 10:
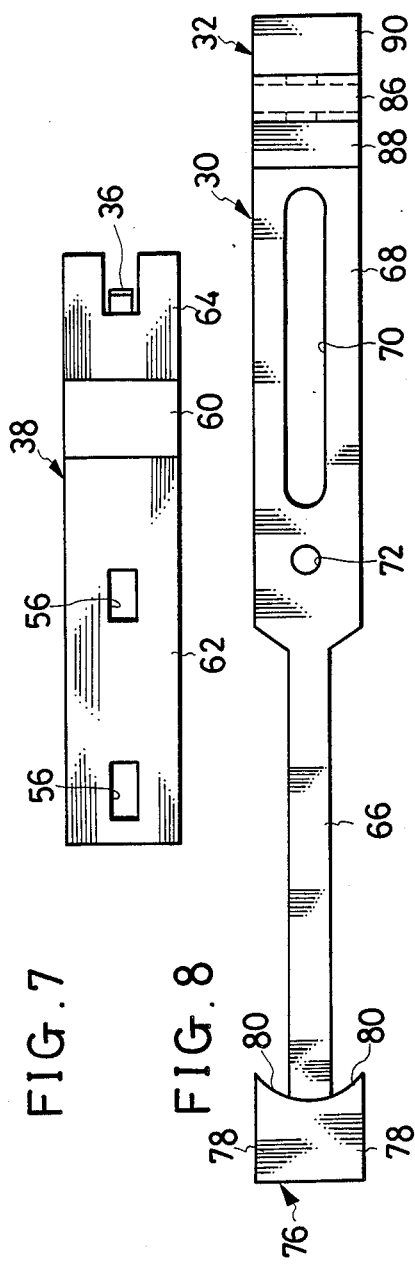
FIG. 7 is an elevation of the band-mounting strip.
FIG. 8 is a developed elevation of the flexible band with the U-shaped spring member secured thereto.
FIG. 9 is a top plan of the showing of FIG. 8.
FIG. 10 is a right hand end elevation of the showing of FIG. 8.

With particular reference to FIG. 7 the mounting strip 38 has two rectangular openings 56 formed in longitudinally spaced locations thereon for engagement with the pair of hooks 52 on the carriage 20. The openings 56 are just lightly more in size than the cross section of the hooks 52 inclusive of their overhangs 54. The noted second hook 36 for engagement with the U-shaped spring member 32 on one end of the flexible band 30 is formed at one end, shown directed to the right in FIG. 7, of the mounting strip 38 by bending a part of the strip.

As will be understood by referring back to FIGS. 2–4, the mounting strip 38 is mounted to the recessed portion 48 of the carriage side surface 40 by receiving the pair of hooks 52 in its openings 56. As the flexible band 30 with the spring member 32 is subsequently mounted in place, the mounting strip 38 is urged by the band tension as indicated by the arrow 58 in FIG. 4 and so is caught by the overhangs 54 of the hooks 52 against the possibility of detachment from the carriage 20.

It will also be noted from FIG. 4 that the mounting strip 38 has an offset 60 between a first portion 62 having the pair of openings 56 and a second portion 64 having the second hook 36 for engagement with the spring member 32 on the flexible band 30. The offset 60 holds the second portion 64 of the mounting strip 38 in coplanar relation to the unrecessed part of the carriage side surface 40. Thus the pair of first hooks 34 and the second hook 36 are formed on the same plane, making it possible to engage the ends of the flexible band 30 with these hooks without intereference with the hooks 52 formed on the recessed surface 48 of the carriage 20 for engagement with the mounting strip 38.

FIGS. 8 and 9 are detailed illustrations of the flexible, nonstretchable band 30 connecting the capstan 28 to the carriage 20, together with the U-shaped spring member 32 attached thereto. Although, typically, the band 30 is made of a stainless steel as aforesaid, other materials might be employed provided that they have a high tensile strength and flexibility but do not stretch to any inconvenient degree when subjected to tension. The illustrated band 30 has a relatively narrow left-hand portion 66 and a wider right-hand portion 68, the two portions being of approximately the same length. The wider portion 68 of the band 30 has a slot 70 cut longitudinally therewith, which slot is just wide enough to permit the narrower portion 66 of the band to pass therethrough with little or no frictional resistance. A hole 72 is defined in the band 30 at a midpoint of its longitudinal dimension for use in fastening the band to the pulley 28 as by a screw 74, FIGS. 1 and 2. It is essential that the hole 72 be larger than the threaded shank of the screw 74, but of course smaller than its head, for purposes that will become apparent as the description proceeds.

The left hand end, as seen in FIGS. 8 and 9, of the band 30 is reinforced by a piece 76 of substantially nonflexible sheet metal. The reinforcement 76 is shaped to provide a pair of arms 78 protruding in the opposite lateral directions of the band. These arms have concave edges 80 for abutment against the convex surfaces 46, FIG. 5, of pair of first hooks 34 on the carriage 20.

Reference is directed to FIGS. 8–10 for a detailed description of the spring member 32. It has a U-shaped portion comprising a pair of substantially straight limbs 82 and 84 which are substantially in parallel spaced relation to each other, and a bight 86 interconnecting the straight limbs each at one end thereof. This U-shaped portion is provided with a pair of flanges 88 and 90 formed on the other ends of the straight limbs 82 and 84, respectively, and extending away in opposite directions therefrom in coplanar relation to each other. The left-hand flange 88, as seen in FIGS. 8 and 9, of the spring member 32 is integrally attached to the end of the wider right-hand portion 68 of the band 30. The right-hand flange 90 is to be held flatwise against the mounting strip 38, as best shown in FIG. 2, when the band 30 is mounted in position on the carriage 20. As best shown in FIG. 10, the straight limb 84 of the U-shaped portion of the spring member 32 is apertured at 92 for engagement with the second hook 36 on the mounting strip 38.

In the assemblage of the transducer positioning mechanism 10 constructed as in the foregoing, the band 30 may first be wound about the pulley 28, with its narrower portion 66 inserted through the slot 70 in its wider portion 68. Then the band 30 may be fastened to the pulley 28 by the screw 74 exerted in and through the clearance hole 72 at the midpoint of the band. At this time, however, the screw 74 may be tightened only to such an extent as to allow both lateral and longitudinal displacement of the band 30 with respect to the pulley 28.

Then the pair of arms 78 on the left hand end of the band 30 may be engaged with the pair of first hooks 34 on the side surface 40 of the carriage 20, with the narrower portion 66 of the band disposed in the spacing between the first hooks, as shown in FIGS. 1 and 5. Then the right hand end of the band 30 may be engaged with the second hook 36 on the mounting strip 38 by receiving the second hook in the aperture 92 in the U-shaped spring member 32. A pull must be exerted on the band 30 in thus engaging the spring member 32 with the second hook 36 as the distance between the first and second hooks 34 and 36 is somewhat longer than the distance between the pair of terminal arms 78 of the band and the aperture 92 in the spring member 32. Since the band 30 is nonstretchable, such a pull will deflect the spring member 32, spreading apart the pair of straight limbs 82 and 84 of its U-shaped portion. Consequently, upon engagement of the second hook 36 in the aperture 92 in the limb 84 of the spring member 32, this spring member will impart tension to the band 30, the latter being still loosely fastened to the pulley 28. The screw 74 may be fully tightened following the engagement of the spring member 32 with the second hook 36.

The tensioning of the band 30 by the U-shaped spring member 32 is not the sole feature of our invention. The band 30 will automatically align itself into right angular relationship with the axis of the pulley 28 on having its opposite ends engaged with the hooks 34 and 36. This self-aligning feature of the band 30 is due in part to the tensioning of the band by the spring member 32, and in part to the pivotal engagement of the opposite ends of the band with the hooks 34 and 36. Not only the single hook 36 engaging the spring member 32 but also the pair of spaced-apart hooks 34 engaging the pair of terminal arms 78 of the band permits the angular displacement of the associated end portion of the band in its own plane. It will also be appreciated that the mounting strip 38 can be positively held against detachment from the carriage 20 by the pair of hooks 52 as the tensioned band 30 exerts a force thereon in the direction of the arrow 58 in FIG. 4.

Although I have shown and described my invention in terms of but one preferable embodiment thereof, I recognize, of course, that my invention could be embodied in other forms within the broad teaching hereof. The following is a brief list of possible modifications of the above disclosed embodiment which I believe fall within the scope of my invention:

1. Another U-shaped spring member could be provided between the other end of the band and the carriage.

2. Not only the contacting surfaces or edges of the pair of first hooks 34 and the pair of terminals arms 78 of the band 30 but also the contacting surface or edges of the second hook 36 and the spring member 32 could be formed in complementarily curved shapes.

3. The second hook 36 may be clinched after engagement with the spring member 32, thereby deflecting the same.

4. The aperture 92 in the spring member 32 could be formed in its flange 90, instead of in the limb 84 of its U-shaped portion.

5. The mounting strip 38 with the second hook 36 is dispensable as the second hook may be formed directly on the carriage 20 or on its extension.

What I claim is:

1. A rotary to linear converter comprising:
   (a) a rotary, bidirectional drive motor having a drive shaft;
   (b) a pulley mounted to the drive shaft for joint rotation therewith;
   (c) guide means defining a path generally tangent to the pulley on the drive shaft;
   (d) a movable member mounted to the guide means for reciprocating movement along the path;
   (e) first and second pivotal engagement means on the movable member arranged in positions spaced apart from each other in the longitudinal direction of the path;
   (f) a band of flexible, nonstretchable material having first and second ends, the band being looped about the pulley with opposite end portions of the band extending away from the pulley in opposite directions along the path, the first end of the band being engaged with the first pivotal engagement means on the movable member so as to permit pivotal motion of a first end portion associated with the first end of the band in its own plane;
   (g) a clearance hole in the band located intermediate the first and second ends thereof;
   (h) a tension spring affixed to the second end of the band for imparting tension thereto and engaged with the second pivotal engagement means on the movable member so as to permit pivotal motion of a second end portion associated with the second end of the band in its own plane; and
   (i) a headed fastener element to be inserted in and through the clearance hole in the band for fastening the same to the pulley;
   (j) whereby the band with the tension spring attached thereto automatically aligns itself in the longitudinal direction of the path when, with the fastener element not fully tightened, the first end of the band and the tension spring are pivotally engaged with the first and second pivotal engagement means.

2. The rotary to linear converter of claim 1 wherein the tension spring is generally U-shaped, comprising a pair of substantially straight limbs and a bight interconnecting the limbs, one of the limbs being secured to the second end of the band, the other of the limbs being engaged with the second pivotal engagement means on the movable member.

3. The rotary to linear converter of claim 2 wherein the second pivotal engagement means comprises a hook formed on the movable member, and wherein said other of the limbs of the spring member has an aperture defined therein for pivotal engagement with the hook.

4. The rotary to linear converter of claim 1 wherein the first pivotal engagement means comprises a pair of hooks formed on the movable member and spaced from each other in a direction parallel to the axis of the pulley on the drive shaft, and wherein the first end of the band is formed to include a pair of arms for pivotal engagement with the pair of hooks.

5. The rotary to linear converter of claim 4 wherein the pair of hooks on the movable member and the pair of arms of the band have complementary curved contact surfaces for pivotal engagement with each other.

6. A transducer positioning mechanism for use in a data transfer apparatus wherein a transducer is transported across a series of concentric data storage tracks on a disklike record medium for accessing the individual tracks, the transducer positioning mechanism comprising:

(a) a rotary, bidirectional drive motor having a drive shaft;

(b) a pulley mounted fast on the drive shaft for joint rotation therewith;

(c) guide means defining a path generally tangent to the pulley on the drive shaft and radial with respect to the record medium;

(d) a carriage adapted to carry the transducer and mounted to the guide means for reciprocating movement along the path;

(e) first and second pivotal engagement means on the carriage arranged in positions spaced apart from each other in the longitudinal direction of the path;

(f) a band of flexible, nonstretchable material having first and second ends, the band being looped about the pulley with opposite end portions of the band extending away from the pulley in opposite directions along the path, the first end of the band being engaged with the first pivotal engagement means on the carriage so as to permit pivotal motion of a first end portion associated with the first end of the band in its own plane;

(g) a generally U-shaped spring member affixed to the second end of the band for imparting tension thereto and engaged with the second pivotal engagement means on the carriage so as to permit pivotal motion of a second end portion associated with the second end of the band in its own plane; and (h) loosenable fastener means for fastening the band to the pulley;

(i) whereby the band with the spring member attached thereto automatically aligns itself in the longitudinal direction of the path when, with the fastener means loosened, the first end of the band and the spring member are pivotally engaged with the first and second pivotal engagement means.

7. The transducer positioning mechanism of claim 6 further comprising a mounting strip of rigid material substantially immovably mounted to the carriage and having formed thereon either of the first and second pivotal engagement means.

8. The transducer positioning mechanism of claim 7 wherein the carriage has hook means formed thereon, and wherein the mounting strip is apertured to be mounted to the carriage by engagement with the hook means.

* * * * *